United States Patent
Hoyle et al.

(10) Patent No.: US 12,436,953 B2
(45) Date of Patent: Oct. 7, 2025

(54) DOCUMENT GENERATION SYSTEM

(71) Applicant: Patently Limited, London (GB)

(72) Inventors: Benjamin James Hoyle, Bath (GB); Jerome Spaargaren, London (GB)

(73) Assignee: Patently Limited, London (GB)

( * ) Notice: Subject to any disclaimer, the term of this patent is extended or adjusted under 35 U.S.C. 154(b) by 0 days.

(21) Appl. No.: 18/932,389

(22) Filed: Oct. 30, 2024

(65) Prior Publication Data

US 2025/0139094 A1    May 1, 2025

Related U.S. Application Data

(60) Provisional application No. 63/594,341, filed on Oct. 30, 2023.

(51) Int. Cl.
| | | |
|---|---|---|
| *G06F 16/00* | (2019.01) |
| *G06F 16/242* | (2019.01) |
| *G06F 16/2455* | (2019.01) |
| *G06F 40/284* | (2020.01) |

(52) U.S. Cl.
CPC ........ *G06F 16/2455* (2019.01); *G06F 16/242* (2019.01); *G06F 40/284* (2020.01)

(58) Field of Classification Search
CPC .................................................. G06F 16/2455
See application file for complete search history.

(56) References Cited

U.S. PATENT DOCUMENTS

| | | |
|---|---|---|
| 2003/0217052 A1 | 11/2003 | Rubenczyk et al. |
| 2018/0336226 A1 | 11/2018 | Anorga et al. |
| 2020/0410678 A1 | 12/2020 | Song et al. |
| 2024/0012844 A1* | 1/2024 | Subraveti ................ G06F 40/30 |

FOREIGN PATENT DOCUMENTS

| | | |
|---|---|---|
| CN | 110472213 A | 11/2019 |
| CN | 116843795 A | 10/2023 |

OTHER PUBLICATIONS

International Search Report dated Feb. 18, 2025 for PCT Application No. PCT/IB2024/060715.

* cited by examiner

*Primary Examiner* — Ajith Jacob
(74) *Attorney, Agent, or Firm* — EIP US LLP

(57) ABSTRACT

User-input unstructured text data describing one or more entities is received, at least one of which is associated with the figure. The unstructured text data is processed to generate corresponding structured text data, and the structured text data is processed to generate a set of parts. A subset of the set of parts identifying parts that are present in the figure is determined and prompt data is formulated for a neural network large language model to generate description text corresponding to the figure. The formulating of the prompt data includes deriving description data associated with the figure from the user-input unstructured text data, deriving part data corresponding to the subset of the set of parts for the figure. The prompt data is sent to the large language model, and in return description text data is received for the figure from the large language model.

23 Claims, 12 Drawing Sheets

Alternatively, you can upload a Word document containing your claims

Upload Word file — 55 or drag and drop your Word file here — 57

B *I* ≡ ≡ $x_2$ $x^2$

1. An auxiliary device for an electronic communication device, the auxiliary device comprising; an input domain comprising;
an input module for entry of data by the user of the auxiliary device;
a processor for processing data input by the user using the input module; and
an encryption module configured to encrypt received data;
an output domain comprising;
an output module for outputting data to the user of the auxiliary device;
a processor for processing received data for output by the output module; and
a decryption module configured to decrypt received data; and
a transmit domain configured to communicate encrypted data received from the input domain, via a first unidirectional data module, to the electronic communication device, wherein the first unidirectional data module prevents data communication from the transmit domain to the input domain; and
a receive domain configured to communicate encrypted data received from the electronic communication device, via a second unidirectional data module, to the output domain, wherein the second unidirectional data module prevents data communication from the output domain to the receive domain.

2. The auxiliary device as in claim 1, wherein the unidirectional data modules are octocouplers.

3. • The auxiliary device as in claim 1 or 2, wherein the unidirectional data modules comprises
a data input;
a data output; and
a controller programmed to permit data transfer through the unidirectional data module from the data input to the data output and to forbid data transfer through the unidirectional data module from the data output to the data input.

4. The auxiliary device as in any previous claim, wherein at least one of the input and output modules are implemented by a transparent touch display module.

5. The auxiliary device as in any previous claim, wherein at least one of the encryption and decryption modules are implemented by a hardware security module.

53

⌖ 51

59 — Process claims

Onardo has generated a features list from your claims
which you can edit before proceeding.

⊚ Next step — 79

Claims feature list
Ref ∧  Part name ∨
no.

1. An auxiliary device for an electronic communication device, the auxiliary device comprising: an input module for entry of data by the user of the auxiliary device;
2. a processor for processing data input by the user using the input module; and
3. an encryption module configured to encrypt received data;
4. an output domain comprising;
5. an output module for outputting data to the user of the auxiliary device;
6. a processor for processing received data for output by the output module; and
7. a decryption module configured to decrypt received data; and
8. a transmit domain configured to communicate encrypted data received from the input domain, via a first unidirectional data module, to the electronic communication device, wherein the first unidirectional data module prevents data communication from the transmit domain to the input domain; and
9. a receive domain configured to communicate encrypted data received from the electronic communication device, via a second unidirectional data module, to the output domain, wherein the second unidirectional data module prevents data communication from the output domain to the receive domain.
10. The auxiliary device as in claim 1, wherein the unidirectional data modules are octocouplers.
11. The auxiliary device as in claim 1 or claim 2, wherein the unidirectional data modules comprises
12. a data input;
13. a data output; and
14. a controller programmed to permit data transfer through the unidirectional data module from the data input to the data output and to forbid data transfer through the unidirectional data module from the data output to the data input.
15. The auxiliary device as in any previous claim, wherein at least one of the input and output modules are implemented by a transparent touch display module.
16. The auxiliary device as in any previous claim, wherein at least one of the encryption and decryption modules are implemented by a hardware security module.

71

○ auxiliary device 🗑
○ controller 🗑
○ data input 🗑
○ decryption module 🗑
○ electronic communication device 🗑
○ encryption module 🗑
○ first unidirectional data module 🗑 — 75
○ hardware security module 🗑
○ input domain 🗑
○ input module 🗑
○ octocouplers 🗑
○ output domain 🗑
○ output module 🗑
○ processor 🗑
○ receive domain 🗑
○ second unidirectional data module 🗑
○ transmit domain 🗑
○ transparent touch display module 🗑

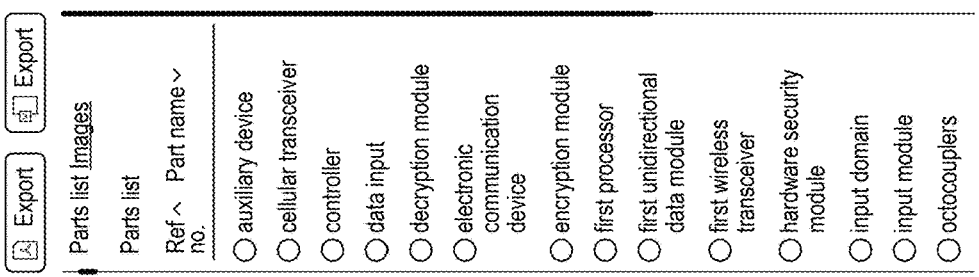

FIG. 12

Your draft is ready

Description of the Auxiliary Device Components

Referring now to Figure 1, an auxiliary device (102) for an electronic communication device is depicted. The auxiliary device (102) comprises an input module (104), a first processor (106), a first unidirectional data module (108), a transmit domain (110), an encryption module (112), a first wireless transceiver (114), a receive domain (116), a second unidirectional data module (118), a second processor (120), an output module (122) and a decryption module (124).

The input module (104) is provided for entry of data by the user of the auxiliary device (102). In some examples, the input module (104) could be implemented using a transparent touch display module. The first processor (106) processes data input by the user using the input module (104).

The encryption module (112) is configured to encrypt data received from the input module (104). In some instances, it may be implemented using a hardware security module. The transmit domain (110) communicates this encrypted data received from the input domain via the first unidirectional data module (108) to the electronic communication device. The first unidirectional data module (108) is designed in such a way that it prevents data communication from the transmit domain (110) to the input domain.

The receive domain (116) communicates encrypted data received from the electronic communication device via the second unidirectional data module (118) to the output domain. The second unidirectional data module (118) is designed to prevent data communication from the output domain to the receive domain. In some examples, the unidirectional data modules (108, 118) could be octocouplers.

The second processor (120) processes received data for output by the output module (122). The output module (122) outputs the processed data to the user of the auxiliary device (102). The decryption module (124) is configured to decrypt received data. In some instances, the decryption module (124) can be implemented using a hardware security module.

In some instances, the unidirectional data modules (108, 118) comprise a controller programmed to permit data transfer through the unidirectional data module from the data input to the data output and to forbid data transfer through the unidirectional data module from the data output to the data input.

Additional Variations

Further variations may be conceived based on the fundamental elements described. For example, the output domain may not be limited to a single data input

101

DOCUMENT GENERATION SYSTEM

CROSS-REFERENCE TO RELATED APPLICATIONS

This application claims the benefit of U.S. Provisional Application No. 63/594,341, filed Oct. 30, 2023, under 35 U.S.C. § 119(a). The above-referenced patent application is incorporated by reference in its entirety.

TECHNICAL FIELD

The present invention generally relates to the field of computer-implemented text generation methods, specifically to the generation of textual descriptions associated with images.

BACKGROUND

Many types of electronic document contain images. Images containing diagrams, charts, etc., are often accompanied by descriptive text in a variety of electronic documents, including patent applications, academic papers, and technical manuals. This descriptive text aids in the understanding of the images, referred to as "figures", by providing additional context or detailing the elements present within the images. The process of generating this text, however, is typically manual and can be time-consuming, especially when dealing with a large number of complex images.

Generative artificial intelligence (AI) offers the ability to generate text based on natural language prompts, and the availability of neural network large language models such as ChatGPT and LLaMa has resulted in widespread interest in how generative AI can be used commercially.

A proposed use for generative AI is to assist the preparation of patent specifications. More particularly, attempts have been made to prepare the textual description part of a patent specification based on a prompt derived from a set of patent claims, with varying degrees of success. One particular challenge faced in preparing a patent specification, or indeed similar types of electronic documents, using generative AI is in preparing not just the text but the accompanying figures of the patent specification.

SUMMARY

According to an aspect of the present invention, there is provided a computer-implemented method of generating text associated with a figure. The method comprises receiving unstructured text data describing one or more entities at least one of which is associated with the figure and processing the unstructured text data to generate corresponding structured text data. A set of parts can then be derived using the structured text data, and a subset of that set of parts determined that identifies parts that are present in the figure. Prompt data can then be formulated using the received unstructured text data and the subset of the set of parts. The prompt data is then sent to a neural network large language model, resulting in description text corresponding to the figure being subsequently received from the neural network large language model. Identifying parts that are present in the figure and incorporating data identifying those parts in the prompt data can provide for more accurate description data for the figure.

In an example, the user-input unstructured text data is processed to identify noun phrases in the text and each new instance of a noun phrase is assigned as a part in the set of parts. One way of identifying the noun phrases comprises tokenising the unstructured text data and for each token, labelling the token with a corresponding part of speech to generated labelled text data, which is then parsed to determine dependency information. Core nouns can then be identified from the labelled text data using the dependency information, and the noun phrases then identified using the identified core nouns. To avoid the same part being listed more than once, the identified noun phrases may be co-referenced, for example using a set of heuristic rules, to identify matching noun phrases, and then the same label may be applied to matching noun phrases.

In an example, the derived set of parts is presented to a user and manually edited prior to the generation of the prompt data. In this way, a more accurate set of parts can be produced.

The subset of the set of parts can be determined either based on user input or automatically or a combination of user input and automatically. In an example, the subset of parts is determined by displaying the figure to a user in an image editor and receiving user input adding callouts to the figure and associating the added callout to a part in the set of parts, wherein the subset of the set of parts is populated with the parts associated with the callouts. In another example, image data corresponding to the figure may be analysed with image analysis software to identify automatically features within the figure likely to correspond to parts in the set of parts, and the set of parts is populated with the parts that are likely to correspond to the identified features. The subset of parts may subsequently be displayed to a user for amendment based on user input. In such examples, a reference numeral may be assigned to the added callout either based on user input or manually and the prompt data may be formulated using the reference numerals linked to the subset of the set of parts to enable the references to be incorporated in the text data received from the neural network large language model.

In one application, the received unstructured text data is a set of patent claims and the figure is a figure for a patent specification such that the text data received from the neural network large language model provides a description for the figure. By generating description for a set of figures, a detailed description section for a patent specification can be developed. In an example, the detailed description for the set of figures is generated iteratively figure by figure so that each figure is generated based on prompt data that is specific to that figure. While the computer-generated description received from the neural network large language model may not be perfect, and it is envisaged that human review will likely be required, the time required to produce a detailed description of the figures that complies with the requirements for a patent specification is expected in most cases to be reduced, particularly as generative AI techniques improve.

The generation of descriptive text can be particularly challenging when the initial input data is unstructured. Unstructured text data, such as claims, sentences or paragraphs describing one or more entities associated with a figure, usually lack a pre-defined model or format, making it difficult to systematically extract relevant information. Thus, the process of converting unstructured text data into a structured format suitable for generating descriptive text is advantageous. Additionally, the task of describing, or indeed initially identifying, parts of the figure that need to be described is a complex and often error-prone process. This is due to the fact that, whilst final text and the figures are, in typical patent specifications, highly related, not all parts that are described in the input data, such as the claims, may be present in the figures, and vice versa. Examples described herein address at least some of these problems.

According to a further aspect of the invention there is provided a computer-implemented method of generating text associated with a system, process and/or apparatus to be shown in a plurality of images including a first figure and a second figure. The method comprises receiving first text data describing one or more aspects of the system, process and/or apparatus shown in the first figure, receiving first user-input part subset data for determining a first subset of a set of parts to be shown in the plurality of images, the first subset identifying parts that are present in the first figure, and formulating first prompt data for a neural network large language model to generate first description text corresponding to the first figure. The formulating of the first prompt data comprises deriving first description data associated with the first figure from the first text data, deriving first part data associated with the first figure from the first user-input part subset data, and generating first prompt data comprising the first description data and the first part data. The first prompt data is sent to the neural network large language model and in return the first description text data is received for the first figure from the neural network large language model. The method also comprises receiving second text data describing one or more aspects of the system, process and/or apparatus shown in the second figure, receiving second user-input part subset data for determining a second subset of the set of parts to be shown in the plurality of images, the second subset identifying parts that are present in the second figure, and formulating second prompt data for the neural network large language model to generate second description text corresponding to the second figure. The formulating of the second prompt data comprises deriving second description data associated with the second figure from the second text data, deriving second part data associated with the second figure from the second user-input part subset data, and generating second prompt data comprising the second description data and the second part data. The second prompt data is sent to the neural network large language model and second description text data for the second figure is received in return from the neural network large language model. The first user-input part subset data and the second input part subset data may be received during an image editing process in which the first figure and the second figure are edited.

According to a further aspect of the invention there is provided a computer-implemented method of generating text associated with a figure, comprising receiving user-input text data describing one or more entities, identifying one or more entities that are associated with the figure, and formulating prompt data for a neural network large language model to generate description text corresponding to the figure. The formulating of the prompt data comprises deriving description data from the user-input text data, deriving part data corresponding to the identified one or more entities, and generating prompt data comprising the description data and the part data. The prompt data is sent to the neural network large language model and description text data for the figure is received from the neural network large language model.

Further features and advantages of the invention will become apparent from the following description of preferred embodiments of the invention, given by way of example only, which is made with reference to the accompanying drawings.

BRIEF DESCRIPTION OF THE DRAWINGS

FIG. 5 shows a screenshot of the first webpage of FIG. 4 following text input by the user;

FIG. 7 shows a screenshot of an example of a second webpage presented to a user of the document generation system of FIG. 1;

FIG. 8 shows another screenshot of the second webpage of FIG. 7 following editing of automatically-generated parts in a parts list by the user;

FIG. 12 shows a screenshot of an example of a fourth webpage presented to a user of the document generation system of FIG. 1.

DETAILED DESCRIPTION

System Architecture

Figure 1:
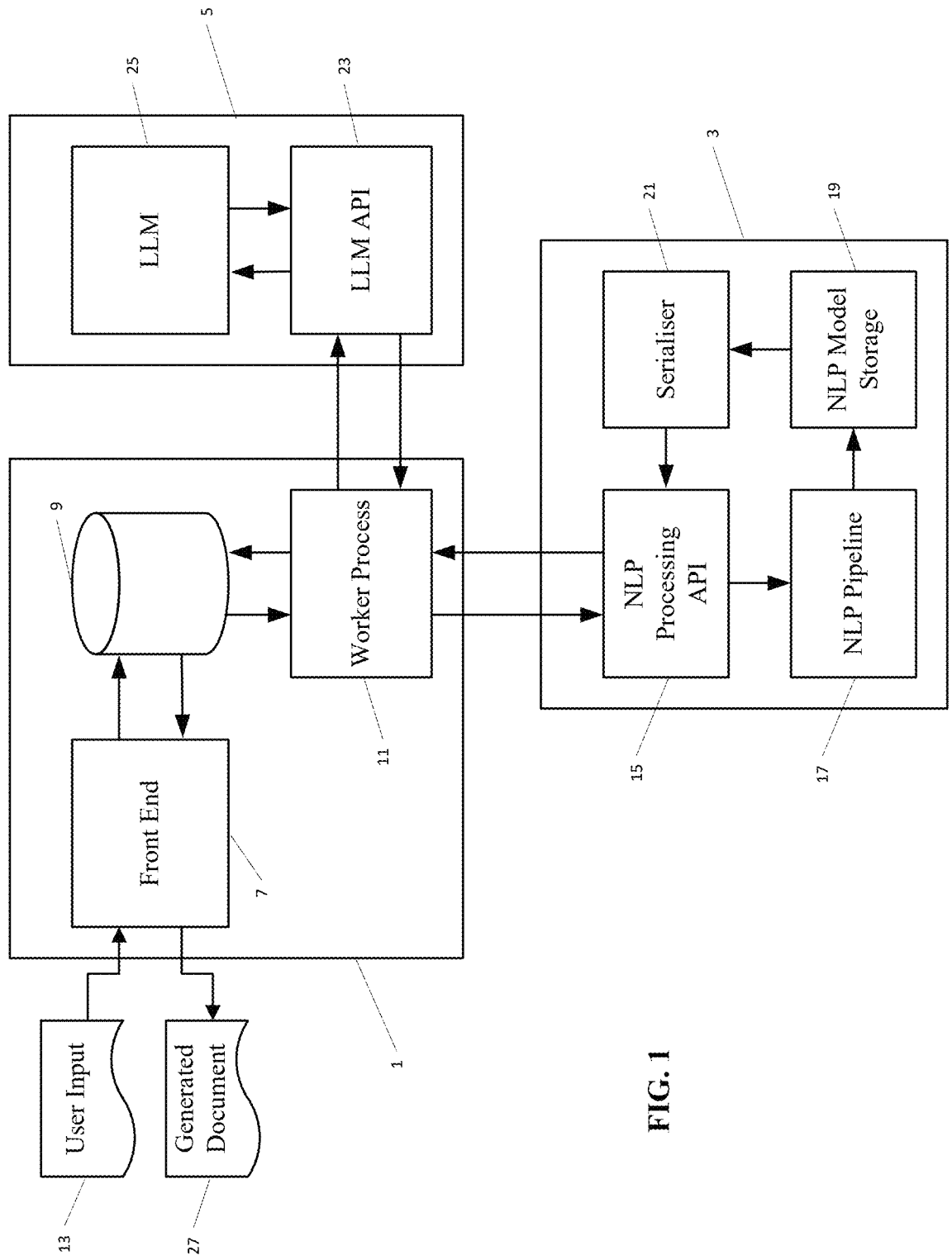
FIG. 1 is a schematic block diagram illustrating the main components of a document generation system.

As shown in FIG. 1, a document generation system includes a platform 1, a natural language processing (NLP) processing system 3 and a neural network large language model (LLM) system 5.

Figure 2:
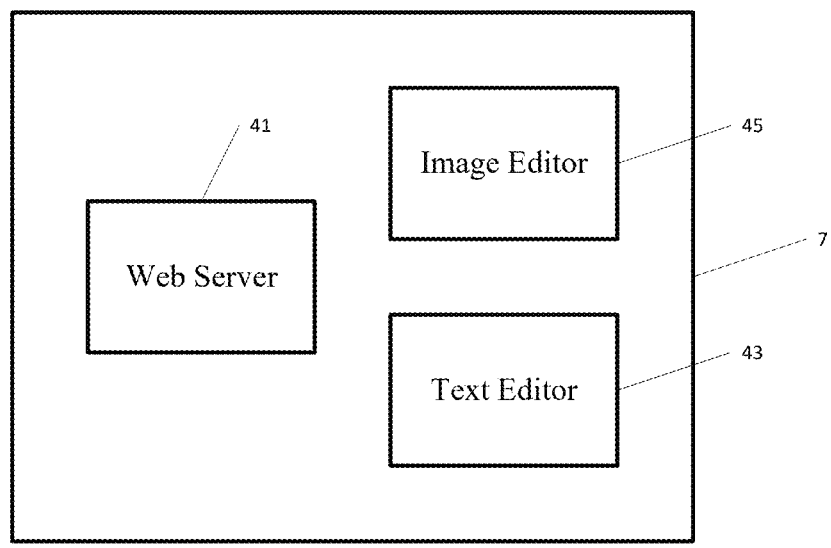
FIG. 2 is a schematic block diagram showing the main components of a front end of the document generation system of FIG. 1.

The platform 1 includes a front end 7 that allows a user to interact with the document generation system by entering user input 13 and accessing a document that is generated based on that user input. As shown in FIG. 2, in this example the front end 7 includes a web server 41, a text editor 43 and an image editor 45. The web server 41 enables the user to interact with the document generation system over the Internet using conventional web browser software. As will be discussed in more detail hereafter, the web server 41 can embed the text editor 43 and/or the image editor 45 in various web pages to enable the user to enter input data 13 in the form of text and one or more figures. Based on the text entered input data 13, the document generation system generates text describing the one or more entered figures.

Returning to FIG. 1, the platform 1 also includes a database 9 and a worker process 11. The database 9 includes a record for each interaction by a user to generate a document, while the worker process 11 images the processing of each interaction using the record stored in the database 9 for that interaction. Database records are maintained for the interactions because the interactions between the platform 1 and the NLP processing system 3 and the neural network LLM 5 can involve significant time delays and during that time delay the platform 1 stores data in the corresponding record in the database 9 and frees up processor resources for other user interactions.

The NLP processing system 3 includes an interface 15 implementing an NLP processing API, an NLP pipeline 17, NLP model storage 19 and a serialiser 21. In this example, the NLP processing API interface 15 is configured to receive unstructured text data for analysis. The NLP pipeline 17 processes the unstructured text data to output a structured text data model, which is stored in the NLP model storage 17. The NLP pipeline includes NLP functionality available in spaCy™, an advanced NLP library available at https://github.com/explosion/spaCy. As will be described in more detail hereafter, in this example the NLP pipeline 17 executes routines from the spaCy library together with heuristic rules to generate the structured text data model. As the NLP processing system 3 is remote from the platform 1 in this example, the structured text data model is serialised by a serialiser 21 for transmission back to the platform 1. In this example, the serialiser encodes the structured text data model as a JSON object for transmission.

The neural network LLM system 5 includes an interface 23 implementing an LLM API and an LLM 25. The interface 23 is configured to receive unstructured text data, hereafter referred to as prompt data, which is input to the LLM 25. In this example, the LLM 25 is the generative pre-trained transformer model called GPT-4™, or a variant thereof, provided by OpenAI to generate an output based on input prompt data. In this way, the prompt data can be used to ask the LLM 25 to generate a desired text output. The extent to which the subsequently generated text output matches the desired text output is dependent on the prompt data. Tailoring the prompt data to improve the quality of the generated text output in comparison with a desired text output is commonly referred to as prompt engineering.

Document Generation

The operation of the document generation system to generate a document descriptive of a figure will now be described with reference to FIGS. 3 to 12. To aid understanding, in tandem with describing generically the operations performed, a specific user interaction will be described, by way of example only, in which a description of a patent figure is automatically generated in response to prompt data that has been engineered using a set of patent claims.

Figure 3:
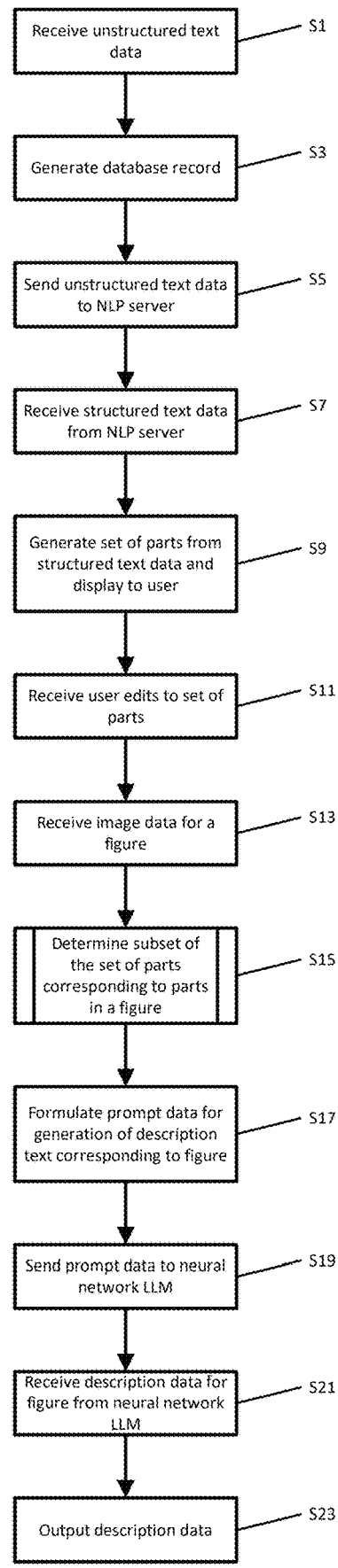
FIG. 3 is a flow chart showing the main operations performed by a platform forming part of the document generation system according to claim 1.
Figure 4:
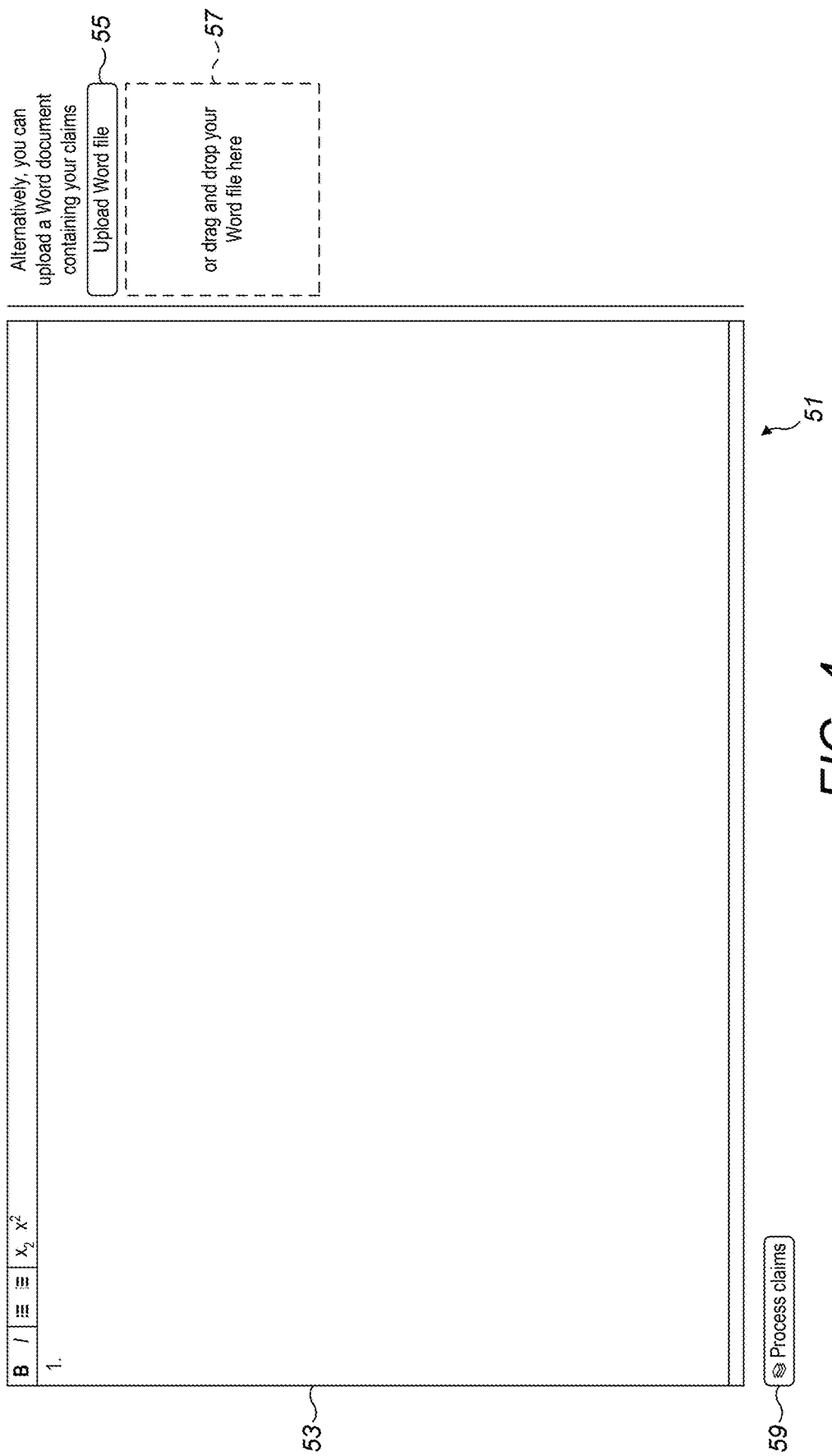
FIG. 4 shows a screenshot of an example of a first webpage presented to a user of the document generation system of FIG. 1.
Figure 6:
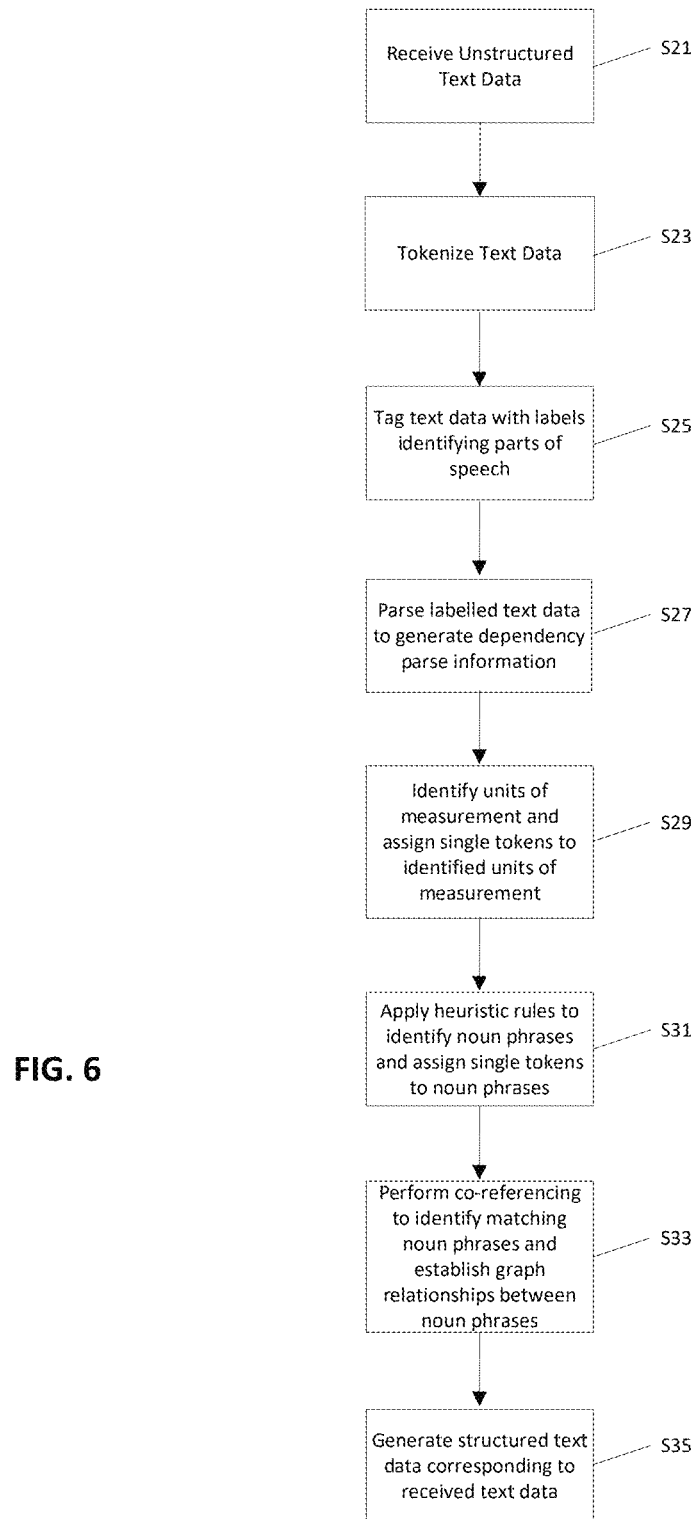
FIG. 6 is a flowchart showing the main operations performed by a natural language processing pipeline implemented by the document generation system of document D1.

As shown in FIG. 3, after a user has navigated to the web server 41 of the platform 1, the user interaction begins with the platform receiving, at Si, unstructured text data from the user. More particularly, the user navigates to a first webpage 51 as illustrated in FIG. 4. The first webpage 51 provides three ways in which a user can enter text data. The first way is a text editing region 53 for the text editor 43 which enables the user to type in text data. The second way is an upload button 55 that enables the user to search a directory structure to identify and upload a text file. The third way is a file uploader box 57 that enables the user to drag and drop a text file into the file uploader box 57 to upload the text file. The first webpage also includes a process text button 59.

FIG. 5 shows the first webpage 51 following text entry, with the entered text displayed in the text editing region 53. It will be seen that the entered text of the specific example is a set of patent claims formed by an independent claim and four dependent claims. When the text has been entered, the user activates the process text button 59, which initiates the front end 7 supplying unstructured text data corresponding to the entered text to the database 9 for processing by the worker process 11.

Returning to FIG. 3, the worker process 11 generates, at S3, a record in the database 9 for the unstructured text data and associates the record with a record identifier. The worker process 11 then sends, at S5, the unstructured text data to the interface 15 of the NLP processing system 3 for processing by the NLP pipeline 17. The operation of the NLP pipeline 17 in this example will now be described with reference to FIG. 6.

Following receipt, at S21, of the unstructured text data, the NLP pipeline 17 tokenises, at S23, the unstructured text data u sing a tokenizer forming part of the spaCy library. This splits the text into tokens, with each token corresponding to a word or a punctuation mark. The NLP pipeline 17 then tags, at S25, the tokenized text data with labels indicating parts of speech, using a tagger that is also part of the spaCy library. The NLP pipeline 17 then parses, at S27, the labelled text data to generate dependency parse information, which indicates grammatical relationships between words represented by the tokens, using a parser that forms part of the spaCy library.

In this example, the NLP pipeline 17 then identifies, at S29, units of measurement and assigns single tokens to each unit of measurement. The NLP pipeline 17 then applies, at S31, a set of heuristic rules to identify noun phrases and assigns a token to each noun phrase. An identified noun phrase may consist of a single word or multiple words. The set of heuristic rules identifies the noun phrases using a combination of the labelling and dependency information to identify core nouns, and then rules identifying when a word dependent on a core noun is actually part of a noun phrase incorporating the core noun. For example, there may be a rule that states that if the core noun "server" is immediately preceded by a dependent noun "web", then there is actually a noun phrase "web server".

At this stage of the processing, a noun phrase corresponding to a particular entity may appear multiple times in the unstructured text data, and each noun phrase will have a different token for each appearance. The NLP pipeline 17 performs, at S33, co-referencing to identify matching noun phrases and establishes a graph relationship between the noun phrases. The NLP pipeline then generates, at S35, structured text data corresponding to the received unstructured text data.

The structured text data output by the NLP pipeline 17 is stored in the NLP model storage 19, serialized by the serializer 21 to generate a corresponding JSON object, and then transmitted back to the platform 1 as a data package including the record identifier.

Returning again to FIG. 3, the platform 1 receives, at S7, the data package conveying the structured data and the record identifier and saves the structured data in the record in the database 9 identified by the database identifier. The worker process 11 then generates, at S9, a set of parts for the entered text with each part of the set of parts corresponding to a noun phrase, and displays the set of parts to the user in a second webpage.

Figure 7:
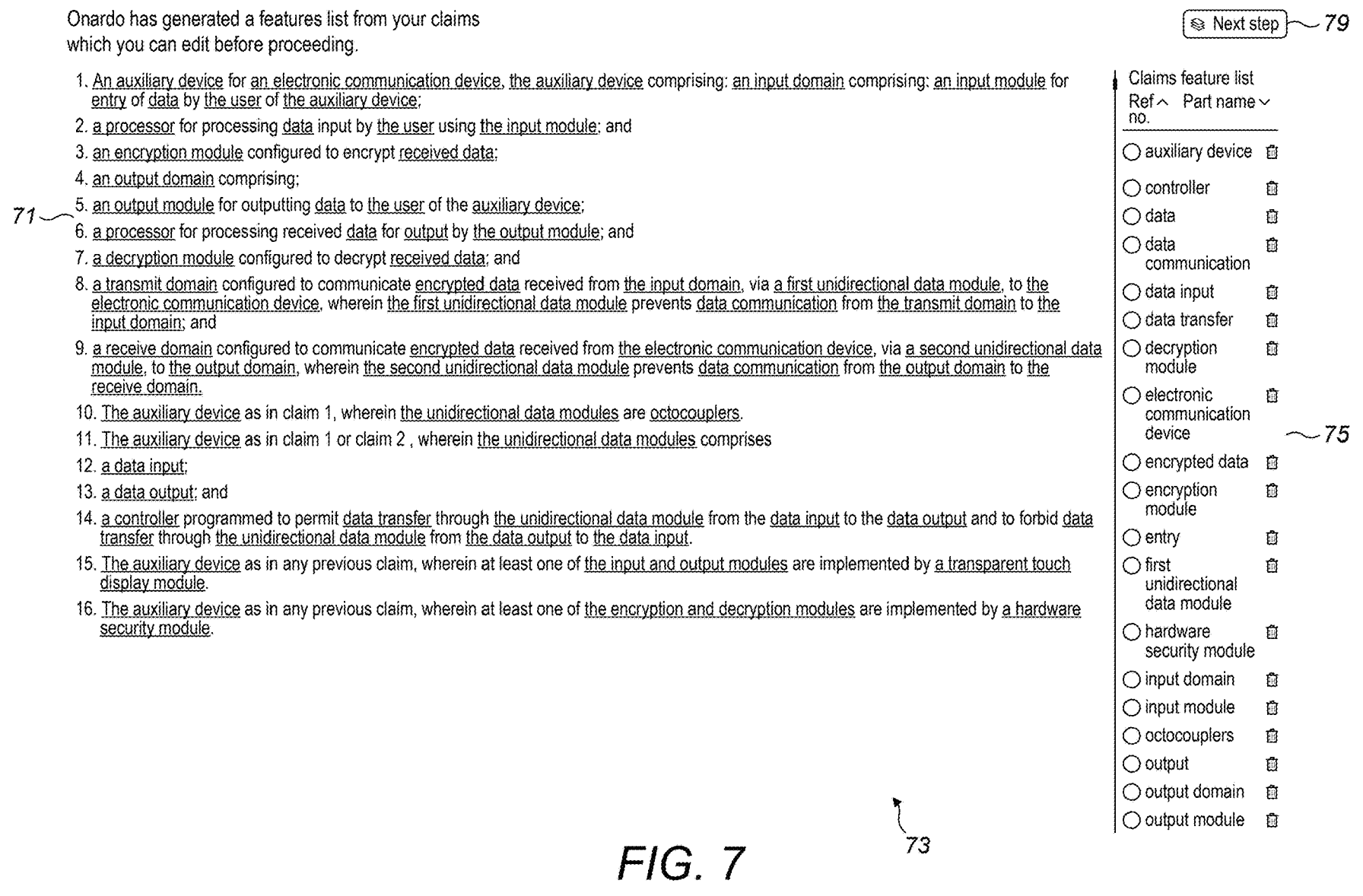
Figure 9:
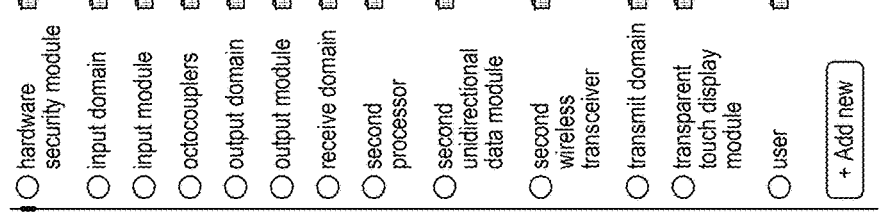
FIG. 9 shows a further screenshot of the second webpage of FIG. 7 following entry of additional parts to the parts list.

FIGS. 7, 8 and 9 show screenshots of the second web page 71 for the specific example at different stages of user interaction. As shown in FIG. 7, in the main region 73 of the second web page 71 the originally entered text has been formatted as a list of features with the noun phrases identified by the NLP pipeline 17, hereafter referred to as candidate noun phrase, underlined. In a sub-region 75 of the second web page 71 is a scrollable list of parts that has been populated with the candidate noun phrases. At the bottom of the scrollable list is a "add new" button 77 (not shown in FIG. 7 but visible in FIG. 9). The second web page 71 also includes a "next step" button 79.

It is apparent from a review of the candidate noun phrases underlined in the main region 73 of the second web page 71 that the NLP pipeline 71 has mischaracterised some of the candidate noun phrases. For example, words such as "entry" have been suggested as candidate noun phrases. To address this eventuality, the second web page 71 allows the list of parts in the sub-region 75 of the second web page to be edited. In particular one or more of the following types of editing functionality may be provided:

- each part may be displayed in association with a trash bin symbol and a part can be removed from the list of parts by activating the associated trash bin symbol;
- the name of the part can be edited in the sub-region 75 of the second web page; and
- a part can be added to the list of parts by clicking the "add new" button and then adding the new part.

FIG. 8 shows a screenshot of the second web page 71 for the specific example after parts have been removed from the list of parts and the names of some parts have been edited. FIG. 9 shows the list of parts after new parts have been added to the list of parts. The user may want to add parts to the list of parts to include parts that are not disclosed in the originally entered text but which do appear in a figure. Once the user has completed editing the list of parts, the user activates the "next step" button.

Returning to FIG. 3, following the receipt, at S11, of edits to the set of parts by the user as discussed above, the platform 1 receives, at 513, image data for a figure. The platform 1 then determines, at S15, a subset of the set of parts corresponding to parts present in the figure.

Figure 10:
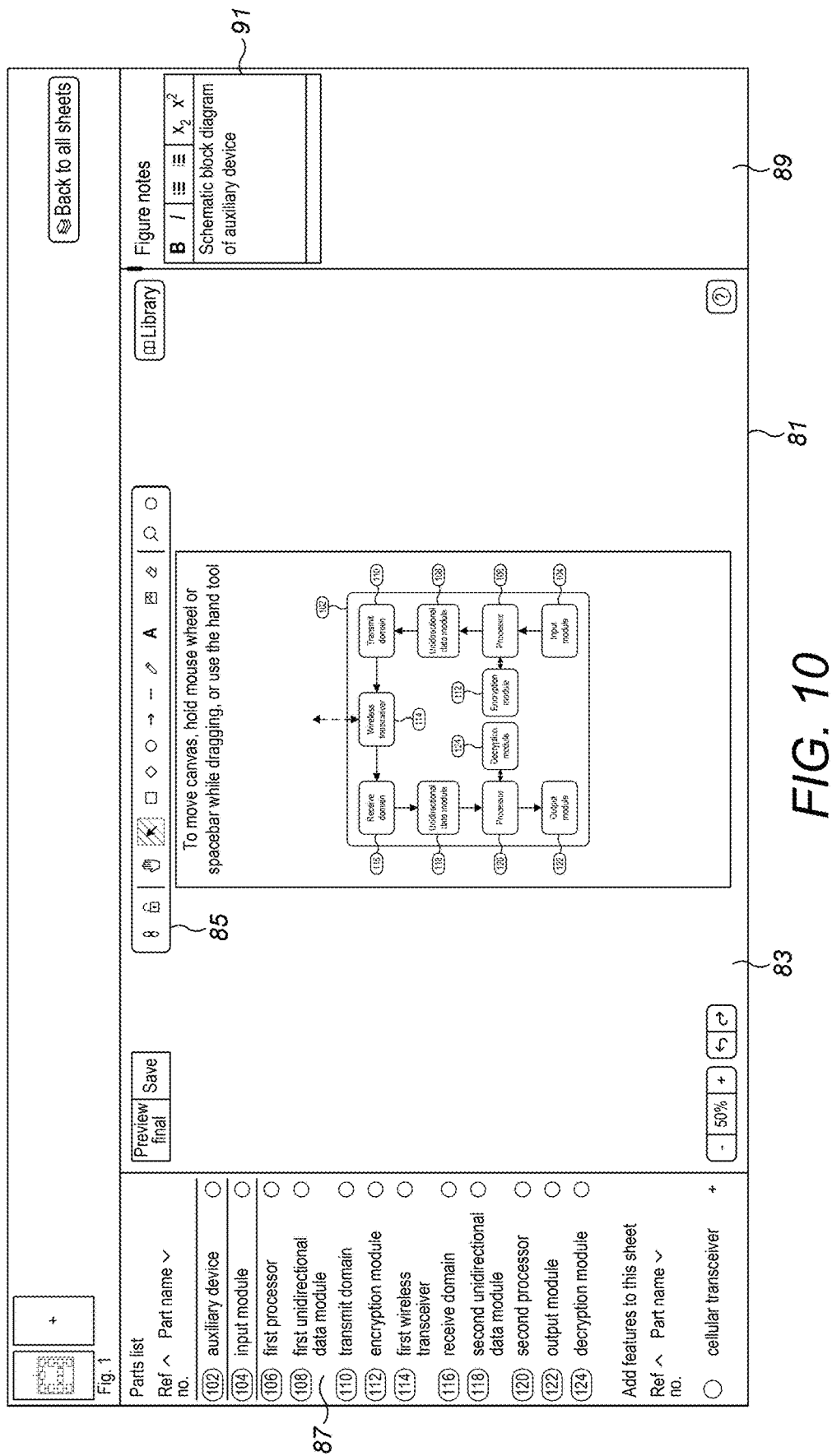
FIG. 10 shows a screenshot of an example of a third webpage presented to a user of the document generation system of FIG. 1.

In this example, the image data is generated and the subset of parts is determined using a third web page 81, illustrated in FIG. 10, in which the image editor 45 is embedded. As shown in FIG. 10, the image editor is accessed via a main region 83 of the third web page 81. The image editor includes user controls 85 that enable a user to generate a drawing. The image editor is in examples based on a modified version of the Excalidraw™ in-browser drawing software, which is available at https://github.com/excalidraw/. The modifications include a callout function which allows a user to label a part in a drawing, or in a pasted-in image, and to assign the part an associated reference numeral.

To one side of the main region 83 of the third web page 81 is displayed the list of parts in two subsets sub a first sub-region 87 of the third webpage 81. The first subset is the parts list for the displayed figure while the second subset lists parts in the set of parts that have not been indicated to be present in the displayed figure. A part can be moved from the second subset to the first subset by selecting the part in the second subset, which causes a callout to be generated that can be dragged onto the figure by the user and attached to the corresponding part in the figure. When attached, the part is assigned a reference numeral and moved from the second subset to the first subset. Alternatively, a callout can be dragged from the user controls 85 and attached to a part in the figure, and then that callout can be assigned to a part in the second subset, automatically causing the part to be assigned a reference number and to be moved from the second subset to the first subset. A second sub-region 89 is displayed to the side of the main region 83 of the third web page opposing the first sub-region 87. A text box 91 is displayed in the second sub-region 89 and enables the user to add text describing the figure. Further text boxes may be displayed in the second sub-region 89 to enable the user to add text describing particular parts in the figure, for example information can be added explaining how a parts that is present in the originally entered text interacts with parts that are present in the originally entered text.

Figure 11:
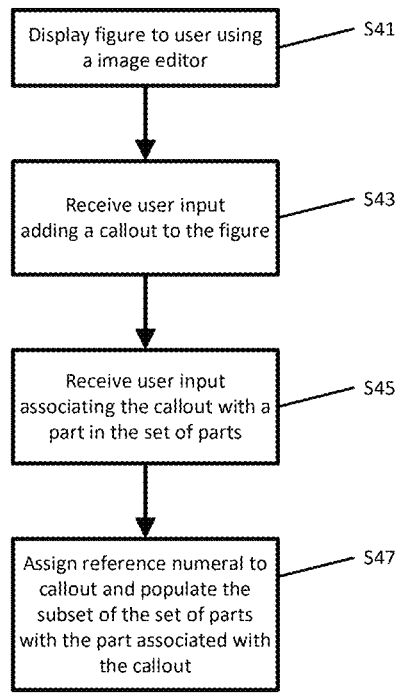
FIG. 11 is a flow chart showing the main operations performed in a process to identify parts included in a figure.

FIG. 11 is a flow chart summarising the main operations performed in this example to move a part from the set of parts into the first subset listing parts that are present in the figure. The figure is displayed, at S41, to the user and user input is received, at S43, adding a callout to the figure and associating the callout with a displayed part. Further user input is received, at S45, associating the callout and a part in the set of parts. A reference numeral is then associated, at S47, with the callout and the corresponding part is moved from the second subset of the set of parts to the first subset of the set of parts.

Returning to FIG. 3, once editing of the figure has been completed and all parts in the figure have been added to the first subset for the set of parts, prompt data is formulated, at S17, for the generation of text corresponding to the figure. This prompt data may include:

- those features in the originally entered text, as shown in the main region 73 of the second webpage 71, that included noun phrases corresponding to parts in the first subset of the set of parts;
- the first subset of the set of parts including their associated reference numerals; and
- any additional text data entered by the user in the third webpage 81 describing the figure or parts of the figure.

The platform 1 then sends, at S19, the prompt data to the neural network LLM system 5 in the form of one or more prompts. Subsequently the platform receives, at S21, the description data for the figure from the neural network LLM system 5 and displays, at S23, the description data to the user.

FIG. 12 shows a fourth webpage 101 showing text generated for the figure of the specific example as illustrated in FIG. 11. The generated text may then be edited by the user to correct any errors introduced by the neural network LLM system 5.

As described above, the document generation system is designed to engineer prompt data to assist a neural network LLM system 5 to generate a description of a figure. While the generation of the prompt data involves user input in several stages, as discussed above, the amount of user input is expected that usually the amount of user input would be significantly less than the amount of user input required to write the text describing the figure without the document generation system. Further, as the performance of the NLP pipeline and the neural network LLM improves over time, it is expected that the level of user input will correspondingly decrease. It is, however, expected that some level of user input will be required to ensure an accurate description of the figure.

Modifications and Further Examples

In the document generation system described above, the determination of the subset of parts present in a figure is based on user input. In an alternative example, the determination could be performed at least in part automatically by using image analysis software to automatically generate a description of a figure.

Figure 13:
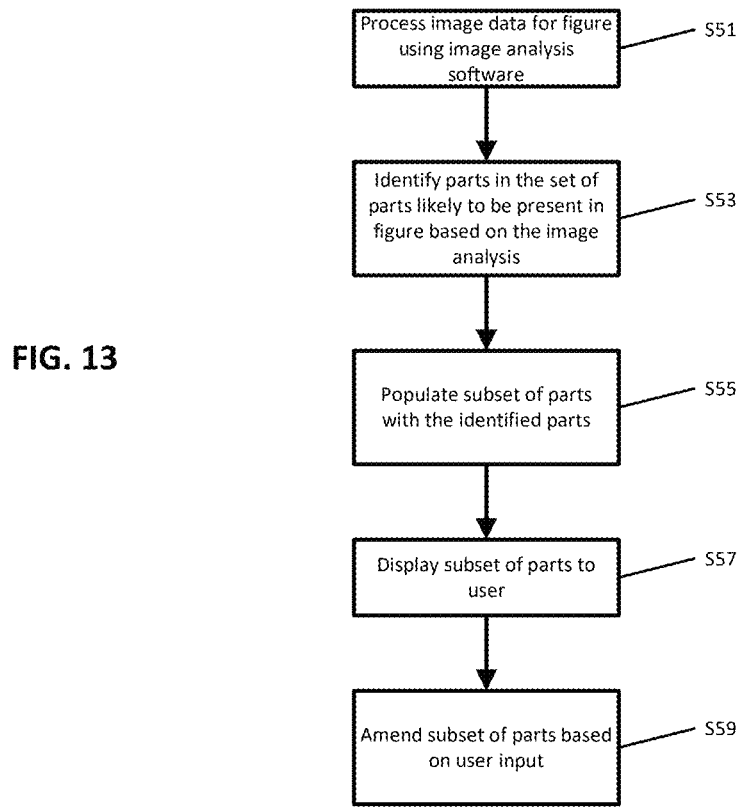
FIG. 13 is a flow chart showing the main operations performed in an alternative process to identify parts included in a figure.

In some examples, as shown in FIG. 13, image data for a figure is processed, at S52, using image analysis software and parts in the set of parts that are likely to be present in the figure are identified, at S53, based on the image analysis. In an example, the image analysis software employs GPT-4V (ision) to enable a neural network LLM to analyse image data and generate image text data providing a description of an image. That image text data can then be compared to the set of parts to identify matches, with the matched parts indicating parts in the set of parts that are likely to be in the figure. The match can be determined based on a set of rules encompassing both identical word matching and synonym matching. The subset of parts is then populated, at S55, with the identified parts and the subset of parts is displayed, at S57, to the user. The user can then amend, at S59, the subset of parts to remove parts not in the figure and to add parts that have not been identified by the image analysis software.

While the automatic document generation system of FIG. 1 is a web-based system that is accessed by a user using a web browser, it will be appreciated that other configurations are possible. For example, the front end could be provided by an application running on a user device, with that application communicating with a database and worker process provided in the cloud. It is also possible for the front end, database, and worker process to all be implemented in a user device, however it is envisaged that the database 9 and worker process 11 will be based in the cloud and handle interactions with many different users.

In the above-described examples, the NLP processing system 3 is separate from the platform 1. Alternatively, the NLP processing system 3 can be implemented on the platform 1, in which case the output from the NLP pipeline 17 can be stored directly in the database 9 making the NLP model storage 19 and the serialiser 21 redundant.

In the above-described examples, the prompt data, which is sent to the neural network LLM before receiving description text data for the figure in return, comprises textual data in the form of the description data and the part data. In alternative examples, once editing of the figure has been completed and all parts in the figure have been added, the figure including all the reference numerals shown as callouts may also be sent to the neural network LLM as part of the prompt data. The neural network LLM may have an image analysis component, such as GPT-4V(ision), to enable the neural network LLM to analyse the figure, as instructed in the prompt data, along with the description data and the part data, to enhance the resulting textual description of the Figure. Since the figure includes the reference numerals and the parts list is given with the corresponding reference numerals, the neural network LLM is able to assign the correctly assigned part names, along with the correctly assigned reference numerals, when describing features from the figure which results from a textual description of the figure generated by the image analysis component.

In the above-described examples, the part data is generated by natural language processing of unstructured text data to generate corresponding structured text data and processing the structured text data to generate a set of parts. A user may edit the structured text data or the set of parts that is generated from the structured text data. In alternative examples, the user may manually enter, or select from one or more suggested part names, part names during an image editing process, e.g. when adding callouts to the figures when using the image editing software, thus obviating the need for, or alternatively supplementing, the processing of the unstructured text data as part of the process to generate the set of parts. The subset of the set of parts that are associated with each figure is then stored against each figure and used to formulate the prompt data for the generation of the description of that particular figure. The process may be repeated for each figure, and the prompt data generated on the basis of the resulting part data, may be sent after each respective figure is drawn and/or edited with callouts or at the end of the image editing process. The resulting part data for each figure, may be included in prompt data for generating a description of the figure along with textual description data, for example patent claim text data identified, by the user or by mapping from the subset of parts to the relevant claims, to be relevant to the figure and/or descriptive text about what is shown in the figure.

While the described NLP processing system 3 utilises routines from the spaCy library, it will be appreciated that alternative routines performing substantially the same function could be used. It will also be appreciated that the heuristic rules applied by the NLP pipeline 17 may be modified based on knowledge of the nature of a figure. For example, when the figure is for a patent specification and the originally entered text is a set of patent claims, the formatting that is specific to a set of patent claims, e.g., the presence of claim numbers and claim dependencies, can be taken into account in the heuristic rules.

Although the neural network LLM system 5 may be implemented in an external system and accessed via an API, in alternative embodiments the neural network LLM system may be a neural network LLM internally hosted on the platform. While the described system uses the ChatGPT™ API to access a neural network LLM based on GPT-4, alternative neural network LLM models could be used, for example PaLM™ by Google and LLaMa™ by Meta.

While a database 9 is used in the document generation system of FIG. 1 to facilitate parallel processing of interactions with many users, particularly given the time delays associated with the NLP pipeline and the neural network LLM system, in alternative embodiments it is possible to use conventional memory management techniques instead.

Screenshots of web pages for an example implementation have been provided to assist explanation. These web pages include graphical user interface (GUI) elements, such as buttons and text boxes, that afford the opportunity for a user to interact with the web page (such GUI elements are sometimes referred to as affordances). It will be appreciated that the design of the web pages could be altered and the affordances replaced with affordances with similar functionality without substantially altering the functionality of the document generation system.

The specific example provided relates to the generation of a patent specification, with the originally received unstructured text data corresponding to a set of patent claims and the figure being a patent figure, with the neural network LLM being used in the generation of a description for the patent figure. The platform may allow a user to input a sequence of patent figures in relation to the same set of claims, as is commonly present patent specifications. As at least at present, neural network LLMs provide best results when the prompt data is both specific and concise, in an example the document generation system iteratively generates figure by figure text for the sequency of patent figures, with the text for a figure being generated as described above, and then concatenates the text for the figures to generate a detailed description of the figures for the patent specification. In addition, prompt data can also be provided to the neural network LLM to generate appropriate background and summary sections so that an entire patent specification can be prepared following generation of a set of patent claims.

Alternative applications of the document generation system can be in the preparation of academic papers or the preparation of technical reports. For all applications, the originally received text data describes entities that can be associated with parts shown in a figure.

It will be appreciated that while the document generation system employs generative AI to generate text content, and that many measures are employed to engineer prompt data that improves the accuracy of the generated text content, the ability for user review and editing is built into the document generation system to allow the opportunity for a user to correct errors that can be introduced when using natural language processing and generative AI.

CONCLUSION

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A computer-implemented method of generating text associated with a figure, the method comprising:
   receiving user-input unstructured text data describing one or more entities at least one of which is associated with the figure;
   processing the unstructured text data to generate corresponding structured text data, and processing the structured text data to generate a set of parts;
   determining a subset of the set of parts identifying parts that are present in the figure;
   formulating prompt data for a neural network large language model to generate description text corresponding to the figure, the formulating of the prompt data comprising:
      deriving description data associated with the figure from the user-input unstructured text data;
      deriving part data corresponding to the subset of the set of parts for the figure; and
      generating prompt data comprising the description data and the part data;
   sending the prompt data to the neural network large language model; and
   receiving description text data for the figure from the neural network large language model.

2. The computer-implemented method of claim 1, wherein processing the user-input unstructured text data to generate corresponding structured text data comprises identifying noun phrases in the text and processing the structured text data to generate a set of parts comprises assigning each new instance of a noun phrase as a part in the set of parts, wherein each noun phrase comprises one or more words including a core noun.

3. The computer-implemented method of claim 2, wherein identifying noun phrases comprises:
   tokenising the unstructured text data;
   for each token, labelling the token with a corresponding part of speech to generated labelled text data;
   parsing the labelled text data to determine dependency information;
   identifying core nouns based on the dependency information; and
   identifying the noun phrases using the identified core nouns.

4. The computer-implemented method of claim 3, further comprising co-referencing the identified noun phrases to identify matching noun phrases, and assigning the same label to matching noun phrases.

5. The computer-implemented method of claim 4, wherein co-referencing the identified noun phrases comprises applying a set of heuristic rules to determine matching noun phrases.

6. The computer-implemented method of claim 1, further comprising:
   displaying the set of parts to a user; and
   amending the set of parts based on user input.

7. The computer-implemented method of claim 1, wherein determining the subset of the set of parts comprises displaying the figure in an image editor and iteratively:
   receiving user input adding a callout to the figure and associating the added callout to a part in the set of parts; and
   populating the subset of the set of parts with the part associated with the callout.

8. The computer-implemented method of claim 7, further comprising for each iteration assigning a reference to the added callout and linking the reference to the associated part,
   wherein the prompt data is formulated using the references linked to the subset of the set of parts to enable the references to be incorporated in the text data received from the large language model.

9. The computer-implemented method of claim 1, wherein determining the subset of the set of parts comprises:
   processing image data corresponding to the figure with image analysis software to identify automatically features within the figure likely to correspond to parts in the set of parts; and
   populating the subset of the set of parts with the parts that are likely to correspond to the identified features.

10. The computer-implemented method of claim 9, further comprising:
    displaying the subset of the set of parts to a user; and
    amending the subset of parts based on user input.

11. The computer-implemented method of claim 9, further comprising:
    automatically adding a callout for each identified component; and
    automatically assigning a reference to the added callout and linking the reference to the associated part,
    wherein the prompt data is formulated using the references linked to the subset of the set of parts to enable the references to be incorporated in the text data received from the neural network large language model.

12. The computer-implemented method of claim 1, further comprising receiving additional user-input unstructured text data that is specific to the figure,
    wherein generating the prompt data comprises further including at least some of the additional user-input unstructured text data.

13. The computer-implemented method of claim 12, wherein receiving the additional user-input unstructured text data comprises displaying the figure and a text box in association with the displayed figure, wherein the text box enables entry of the additional user-input unstructured text data by the user using a text editor.

14. The computer-implemented method of claim 1, further comprising:
    receiving image data for the figure;

generating second prompt data for a second neural network large language model to generate computer-generated unstructured text data that is specific to the figure;

sending the second prompt data to the second neural network large language model; and receiving the computer-generated text data from the second neural network large language model, wherein generating the prompt data comprises further including at least some of the computer-generated unstructured text data.

15. The computer-implemented method of claim 1, comprising generating text for a sequence of images by iteratively performing the computer-implemented method for each image, and concatenating the generated text for each image.

16. The computer-implemented method of claim 1, wherein the user-input unstructured text data comprises a set of patent claims, wherein the figure is a figure for a patent specification and the generated text is specific description of the figure for inclusion in the patent specification.

17. A computer-implemented method of generating text associated with a figure, the method comprising:

receiving text data describing one or more entities at least one of which is associated with the figure;

processing the text data to generate a set of parts;

determining a subset of the set of parts identifying parts that are present in the figure;

formulating prompt data for a neural network large language model to generate description text corresponding to the figure, the prompt data including at least part of the received text data and part data corresponding to the subset of the set of parts for the figure;

sending the prompt data to the neural network large language model; and receiving description text data for the figure from the neural network large language model.

18. The computer-implemented method of claim 17, wherein processing the text data to generate a set of parts comprises sending the text data to a natural language processing pipeline to identify noun phrases within the text data, and populating the set of parts based on the noun phrases.

19. A computer program product comprising a non-transitory computer readable medium having computer program instructions stored therein, the computer program instructions when executed by a processor, cause the processor to carry out a method as claimed in claim 1.

20. A computer-implemented document generation system configured to perform a method as claimed in claim 1.

21. A computer-implemented method of generating text associated with a system, process and/or apparatus to be shown in a plurality of images including a first figure and a second figure, the method comprising:

receiving first text data describing one or more aspects of the system, process and/or apparatus shown in the first figure;

receiving first user-input part subset data for determining a first subset of a set of parts to be shown in the plurality of images, the first subset identifying parts that are present in the first figure;

formulating first prompt data for a neural network large language model to generate first description text corresponding to the first figure, the formulating of the first prompt data comprising:

deriving first description data associated with the first figure from the first text data;

deriving first part data associated with the first figure from the first user-input part subset data; and generating first prompt data comprising the first description data and the first part data;

sending the first prompt data to the neural network large language model;

receiving first description text data for the first figure from the neural network large language model;

receiving second text data describing one or more aspects of the system, process and/or apparatus shown in the second figure;

receiving second user-input part subset data for determining a second subset of the set of parts to be shown in the plurality of images, the second subset identifying parts that are present in the second figure;

formulating second prompt data for the neural network large language model to generate second description text corresponding to the second figure, the formulating of the second prompt data comprising:

deriving second description data associated with the second figure from the second text data;

deriving second part data associated with the second figure from the second user-input part subset data; and generating second prompt data comprising the second description data and the second part data;

sending the second prompt data to the neural network large language model; and receiving second description text data for the second figure from the neural network large language model.

22. The computer-implemented method of claim 21, wherein the first user-input part subset data and the second input part subset data are received during an image editing process in which the first figure and the second figure are edited.

23. A computer-implemented method of generating text associated with a figure, the method comprising:

receiving user-input text data describing one or more entities;

identifying one or more entities that are associated with the figure;

formulating prompt data for a neural network large language model to generate description text corresponding to the figure, the formulating of the prompt data comprising:

deriving description data from the user-input text data;

deriving part data corresponding to the identified one or more entities; and generating prompt data comprising the description data and the part data;

sending the prompt data to the neural network large language model; and receiving description text data for the figure from the neural network large language model.

* * * * *